US008694745B2

(12) United States Patent
Sabjan et al.

(10) Patent No.: US 8,694,745 B2
(45) Date of Patent: Apr. 8, 2014

(54) PHYSICAL TO VIRTUAL DISKS CREATION (P2V) METHOD, BY HARVESTING DATA FROM CRITICAL SECTORS

(75) Inventors: Check A. Sabjan, Sanford, FL (US); Kirk L. Searls, Maitland, FL (US); Lokesha B. Krishnamurthy, Sanford, FL (US)

(73) Assignee: Symantec Corporation, Mountain View, CA (US)

( * ) Notice: Subject to any disclaimer, the term of this patent is extended or adjusted under 35 U.S.C. 154(b) by 269 days.

(21) Appl. No.: 12/882,375

(22) Filed: Sep. 15, 2010

(65) Prior Publication Data

US 2012/0066446 A1    Mar. 15, 2012

(51) Int. Cl.
*G06F 13/00* (2006.01)

(52) U.S. Cl.
USPC .......... 711/162; 711/112; 714/4.11; 707/640; 707/681

(58) Field of Classification Search
USPC ............... 707/681, 640; 718/1; 711/162, 112; 714/4.11
See application file for complete search history.

(56) References Cited

U.S. PATENT DOCUMENTS

| 7,356,679 | B1 | | 4/2008 | Le et al. ............................ 713/1 |
| 8,099,391 | B1 | * | 1/2012 | Monckton ...................... 707/647 |
| 8,117,168 | B1 | * | 2/2012 | Stringham ..................... 707/646 |
| 8,156,301 | B1 | * | 4/2012 | Khandelwal et al. ......... 711/170 |
| 8,438,349 | B2 | * | 5/2013 | Olson et al. .................... 711/162 |
| 2004/0260898 | A1 | * | 12/2004 | Stanley et al. ................. 711/162 |
| 2004/0268070 | A1 | * | 12/2004 | Hasegawa ...................... 711/162 |
| 2005/0268054 | A1 | * | 12/2005 | Werner et al. ................. 711/162 |
| 2007/0260831 | A1 | | 11/2007 | Michael et al. ................ 711/162 |
| 2009/0265706 | A1 | * | 10/2009 | Golosovker et al. .............. 718/1 |
| 2010/0049750 | A1 | * | 2/2010 | Srivastava et al. ............ 707/202 |
| 2010/0049930 | A1 | * | 2/2010 | Pershin et al. ................ 711/162 |

FOREIGN PATENT DOCUMENTS

WO    WO 2010/095174    8/2010

* cited by examiner

*Primary Examiner* — Hong Kim
(74) *Attorney, Agent, or Firm* — Campbell Stephenson LLP

(57) ABSTRACT

A virtual disk can be created by using data from critical sectors of a primary physical disk. The creation of a virtual disk involves receiving sector numbers and corresponding data for critical sectors of a primary physical disk on a primary computing system, creating a virtual disk that comprises sectors, and writing data from the critical sectors of the primary physical disk into respective sectors of the virtual disk.

22 Claims, 7 Drawing Sheets

PHYSICAL TO VIRTUAL DISKS CREATION (P2V) METHOD, BY HARVESTING DATA FROM CRITICAL SECTORS

BACKGROUND OF THE INVENTION

1. Field of the Invention

This invention relates to creating disks, and more particularly, to creating virtual disks from physical disks.

2. Description of the Related Art

Conventional methods for creating virtual disks from physical disks include the use of virtualization programs. These virtualization programs can create virtual disks from physical disks and copy data onto a virtual disk on a sector-by-sector basis.

Typically, data is organized and backed up on a file-by-file basis, which differs from a sector-by-sector basis. Thus, problems may arise when copying backup data onto a virtual disk on a file-by-file basis.

SUMMARY

Various systems and methods for creating a virtual disk from a physical disk by harvesting data from critical sectors are disclosed.

For example, a method involves receiving sector numbers for critical sectors of a first physical disk on a primary computing system, receiving corresponding data from the critical sectors of the first physical disk, creating a virtual disk, wherein the virtual disk comprises sectors, and writing data from the critical sectors of the first physical disk into respective sectors of the virtual disk, wherein the respective sectors are identified by the sector numbers.

In some embodiments, the method may also be performed for a second physical disk on the primary computing system. This method involves receiving second sector numbers for second critical sectors of a second physical disk on the primary computing system, receiving second corresponding data from the second critical sectors of the second physical disk, creating a second virtual disk, wherein the second virtual disk comprises sectors, and writing data from the second critical sectors of the second physical disk into respective sectors of the second virtual disk, wherein the respective sectors are identified by the second sectors numbers.

In one embodiment, the method may also involve accessing a virtual machine in the event of a failure in a primary computing system or the first physical disk, wherein the virtual machine accesses the virtual disk.

In one embodiment, the sector numbers and corresponding data from the critical sectors of the first physical disk are received during a backup operation.

In some embodiments, the method may also involve performing a backup of user data within files stored on the first physical disk, wherein the user data is backed up as files and stored on a backup server. In one embodiment, the user data is received from the backup server and written to a virtual disk.

In some embodiments, the method may also involve mounting a volume on the virtual disk and formatting the volume according to a file system.

An example of a system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
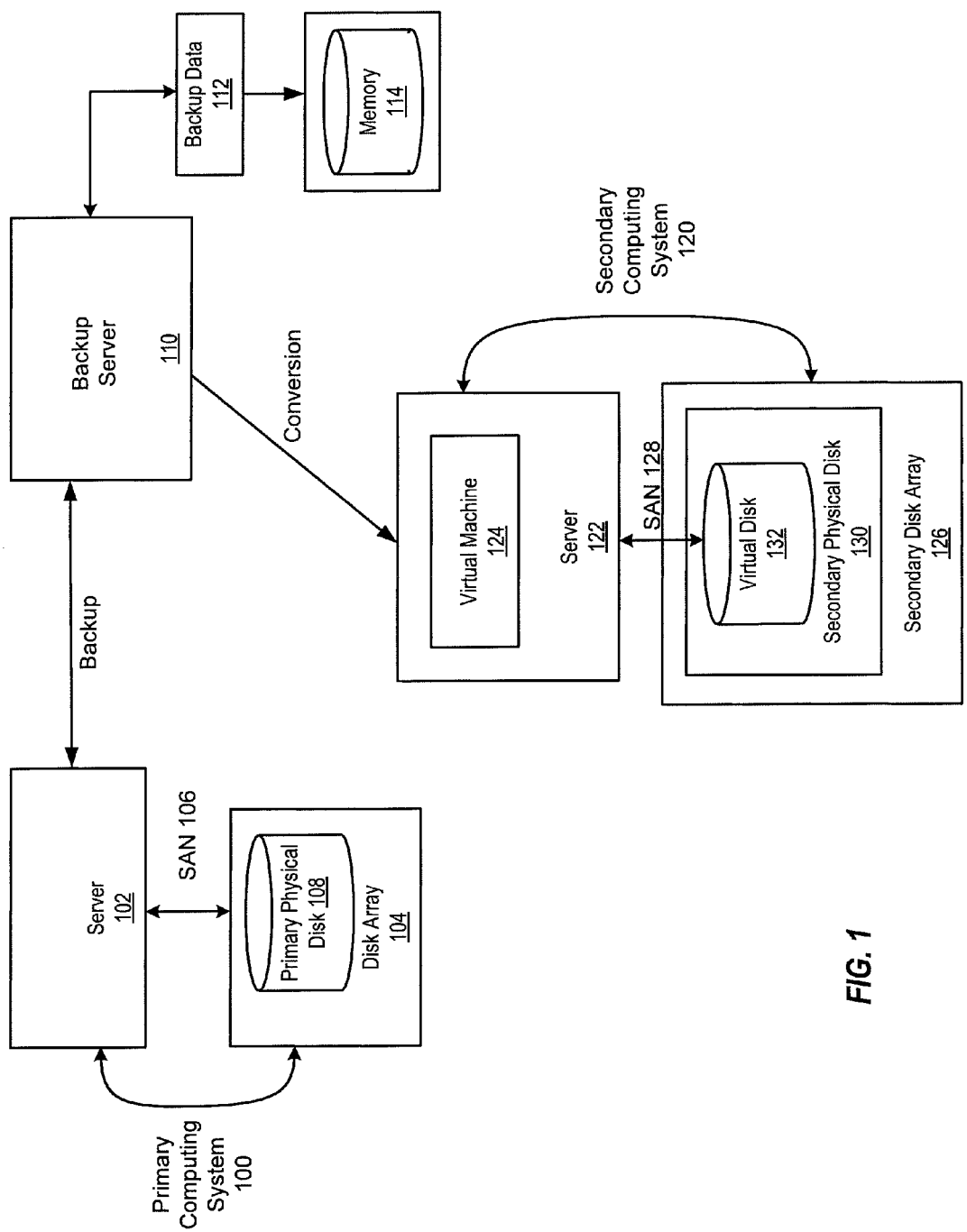
FIG. 1 is a block diagram showing relevant components of a system for providing business continuity, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Business continuity is a feature that allows businesses to resume processing transactions with minimum downtime after a primary computing system fails. A primary computing system typically includes a computer system (e.g., a server), an operating system, at least one application, data, and memory which together is used to process business transactions. Business continuity is possible by using virtual machines operating on one or more secondary servers. When a primary computing system fails, a virtual machine is called upon to act as a substitute for processing business transactions as quickly and seamlessly as possible.

FIG. 1 is a block diagram showing relevant components of a system for providing business continuity. As shown, the system includes a primary computing system 100. Although not shown, additional primary computing systems may be included. Primary computing system 100 is typically employed by businesses to process business transactions received from other computer systems (e.g., clients). Primary computing system 100 includes a server 102 in communication with disk array 104. Communications between server 102 and disk array 104 may occur via SAN 106. Disk array 104 includes a primary physical disk 108. In addition, although not shown, disk array 104 may also include additional physical disks. In one embodiment, a physical disk may take form in a logical aggregation of physical memory from one or more disks within disk array 104.

At pre-defined time periods, a backup of the data on the primary physical disk 108 is performed by backup server 110. Backup data 112 is then stored in memory 114 by backup server 110.

The system of FIG. 1 also includes a secondary computing system 120. Secondary computing system 120 includes a server 122 that implements a virtual machine 124 which acts as a failover to primary computing system 100. Although not shown, server 122 may implement another virtual machine that acts as a failover to another primary computing system, which is also not shown. Virtual machine 124 is used in the event that the primary computing system 100 fails. When primary computing system 100 fails, business transactions can be redirected to virtual machine 124.

In the event of a failure, businesses would like the failover to be as quick and seamless as possible. Before the virtual machine can process redirected business transactions, a corresponding virtual disk would ideally be set up to have the same organization as the primary physical disk.

Typically, a primary computing system is made up of one or more primary physical disks. For ease of explanation, primary computing system 100 will be described as having one physical disk 108. The primary physical disk may store one or more volumes, which in turn store file systems.

Before a virtual machine can start processing redirected business transactions, a corresponding virtual disk is created for each respective primary physical disk. A virtual disk can be formed from one or more underlying secondary physical disks. Secondary computing system 120 is shown as having a secondary disk array 126 in communication with server 122 via SAN 128. Secondary disk array 126 includes a secondary physical disk 130 from which a virtual disk 132 may be created. A secondary physical disk 130 may be used to create more than one virtual disk. In one embodiment, a virtual disk may take form in a logical aggregation of physical memory from one or more disks within secondary disk array 126.

A typical method for creating virtual disks involves the use of a virtualization program and its corresponding application program interface (API). This API allows for the creation of an empty virtual disk followed by the storage of backup data onto the virtual disk on a sector-by-sector basis.

The problem with this methodology is that many businesses would prefer to backup data on a file-by-file basis, not a sector-by-sector basis. Sector information is more basic information than file information. In addition, file information may not be contiguous and thus does not allow for easy mappings between file information and sector information. Therefore, APIs of available virtualization programs require use of backup systems that operate on a sector-by-sector basis rather than a file-by-file basis.

Thus, it is desirable to have a method for creating a virtual disk in a manner that allows for storing backup data onto the virtual disk on a file-by-file basis using the available virtualization programs. Doing so would allow backup data, organized on a file-by-file basis, to be quickly written into corresponding files and folders within a virtual disk, given that a virtual disk should already be configured to receive data in such a format.

Figure 2:
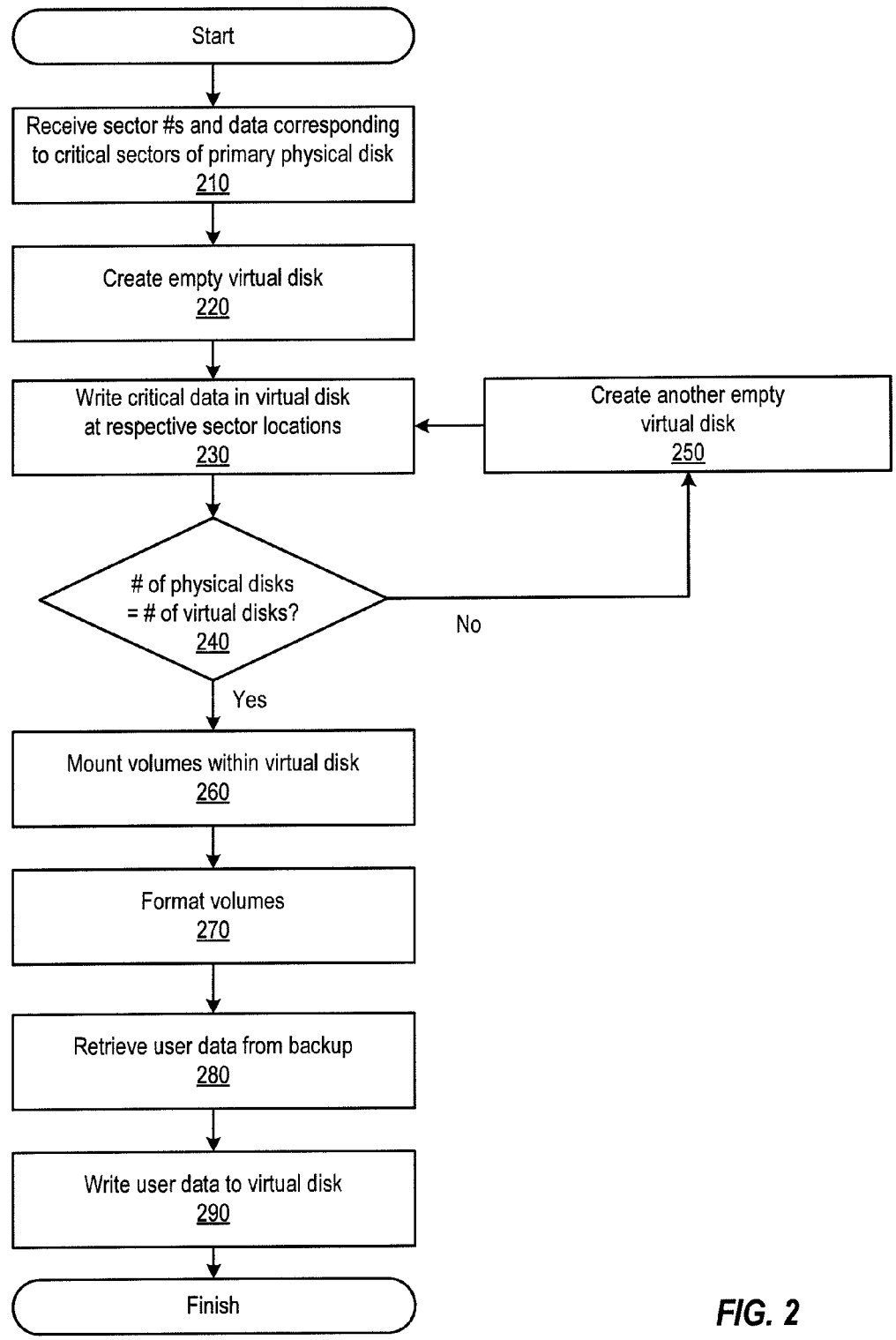
FIG. 2 is a flowchart illustrating relevant aspects of an example method for creating a virtual disk, according to one or more embodiments of the present invention.

FIG. 2 illustrates relevant aspects of an example method of creating a virtual disk. The method of FIG. 2 allows for the creation of virtual disks and allows for backup data to be copied to the virtual disk on a file-by-file basis using the API of well-known virtualization programs.

The method begins at 210, when a receiving module on a computer system (e.g., backup server) receives sector numbers and corresponding data for critical sectors from a primary physical disk. Critical sectors can be identified during a backup process performed on a primary computing system. Critical sectors may include sectors within a primary physical disk that have the information used to operate the primary physical disk and used to specify the geometry of the primary physical disk. Disk geometry includes elements such as boot code, disk signature, partition layouts on a physical disk, and volume information in case of dynamic disks.

Examples of critical sectors may include a master boot record (MBR), extended partition boot record (EBR), logical disk manager (LDM), and extensible firmware interface (EFI) sectors. An MBR is typically the first sector of a physical disk. An EPBR is used to handle logical volumes within a primary physical disk. An LDM is used to handle dynamic disks. And, an EFI sector is used to handle GUID partition tables.

Once the critical sectors have been identified, the sector numbers and data corresponding to each critical sector are collected and stored within storage that is accessible by the backup server. An example of critical data collected for a primary physical disk includes 4 critical sectors: (1) MBR with a sector number of 0 and data D1, (2) EBR 1 with a sector number 4954450 and data D2, (3) EBR2, with a sector number of 193390470 and data D3, and (4) EBR 3 with a sector number 2144390656 and data D4.

The method continues at 220, where the backup server creates an empty virtual disk 220. This empty virtual disk can be created using the API of a virtualization program and a secondary physical disk array in communication with the backup server. Examples of virtualization programs include VMware and Hyper-V. An example of an empty virtual disk created by one of these virtualization programs would be a file with an extension, such as virtual_disk.vmdk or virtual_disk.vhd.

Critical data is then written onto the empty virtual disk, as shown in 230. The critical data is written at the respective sector locations of the virtual disk using the sector numbers received at 210.

At 240, the backup server determines whether the number of primary physical disks on the primary computing system (i.e., presented by the primary disk array that includes several hard disks) is equivalent to the number of virtual disks that have been created for the virtual machine (i.e., presented by the secondary disk array that includes several hard disks). A primary disk array within the primary computing system may include a plurality of primary physical disks. For each primary physical disk that exists within the primary computing system, a corresponding virtual disk is desired to conserve the geometry of the primary computing system.

In the event that more than one primary physical disk exists within a primary computing system, the backup server creates a second virtual disk, as shown in 250. The critical data that applies to this second primary physical disk is written to the second virtual disk at the respective sector locations, as shown in 230.

This methodology (i.e., described by 240 with a determination leading to 250 and 230) is repeated until the backup server determines that each primary physical disk on a primary computing system has a corresponding virtual disk within the secondary disk array and thus the number of primary physical disks is equivalent to the number of virtual disks.

By writing the critical data in each virtual disk, the proper volumes are created within each virtual disk. The volumes within each virtual disk are then mounted, as shown in 260. At this point, the volumes are unformatted.

At 270, the volumes within each virtual disk are formatted. Each volume within a virtual disk is formatted according to a file system. Examples of file systems include File Allocation Table (FAT), 32-bit File Allocation Table (FAT32), or New Technology File System (NTFS).

At 280, user data is retrieved from backup. User data is routinely collected and backed up during pre-determined times. For example, a business may choose to perform a backup of user data on a daily basis at a particular time of day. This backup data is typically stored within memory accessible by a backup server but may also be stored within memory accessible by the primary computing system.

The user data is then written to each respective virtual disk at respective file and folder locations, as shown in 290. Once the user data is written to each virtual disk, the process finishes. The method of FIG. 2 may be repeated during each backup of the primary computing system to create new virtual disks or update existing virtual disks.

When the method of FIG. 2 finishes, the virtual disks are ready to be accessed by a virtual machine in the event of a failure at the primary computing system. The operation of FIG. 2 thus allows the virtual machine (i.e., the central processing unit and memory) to operate in a warm-standby mode and thereby conserve computing resources.

In the event of a failure, the virtual machine begins running, has immediate access to the virtual disks, and may begin processing redirected business transactions. The virtual disks, when accessed by a virtual machine, include user data that is current up to the last backup performed on the primary computing system. At this point, additional user data (produced after the last backup) may be added to update the user data to the latest version that existed immediately before a failure occurs.

Figure 3:
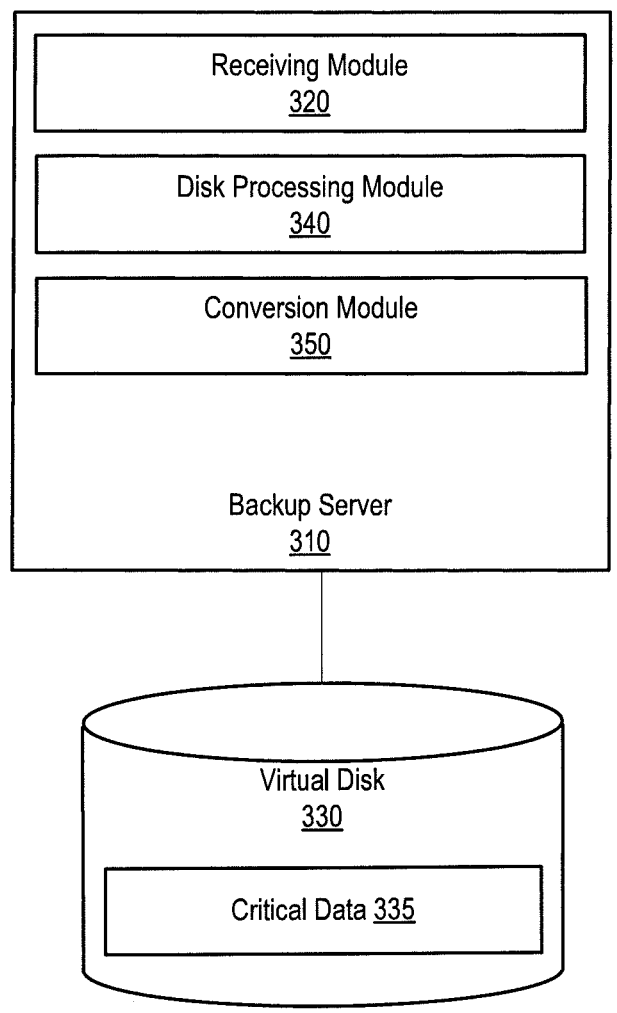
FIG. 3 is a block diagram showing relevant components of a backup server for creating a virtual disk, according to one or more embodiments of the present invention.

FIG. 3 illustrates relevant components of a backup server for creating a virtual disk. As shown, backup server 310 includes a plurality of modules, which may take form in software instructions executing on one or more processors.

First, backup server 310 may include a receiving module, as shown in 320, for receiving critical data. This critical data includes the sector numbers and corresponding data for the critical sectors in each primary physical disk. Once received, this critical information may be stored within virtual disk 330 as critical data 335.

A second module is a disk processing module, as shown in 340, for creating and processing virtual disks. Disk processing module 340 can create empty virtual disks, write critical data to each virtual disk to create the proper volumes, mount these volumes, and format the volumes according to a file system. Disk processing module 340 may employ a virtualization program and its API to perform these operations.

Backup server 310 may also include a conversion module, such as 350, for reading and writing backup data onto the virtual disk on a file-by-file basis. The conversion process is performed as part of a backup process and may be repeated at each backup.

Figure 4:
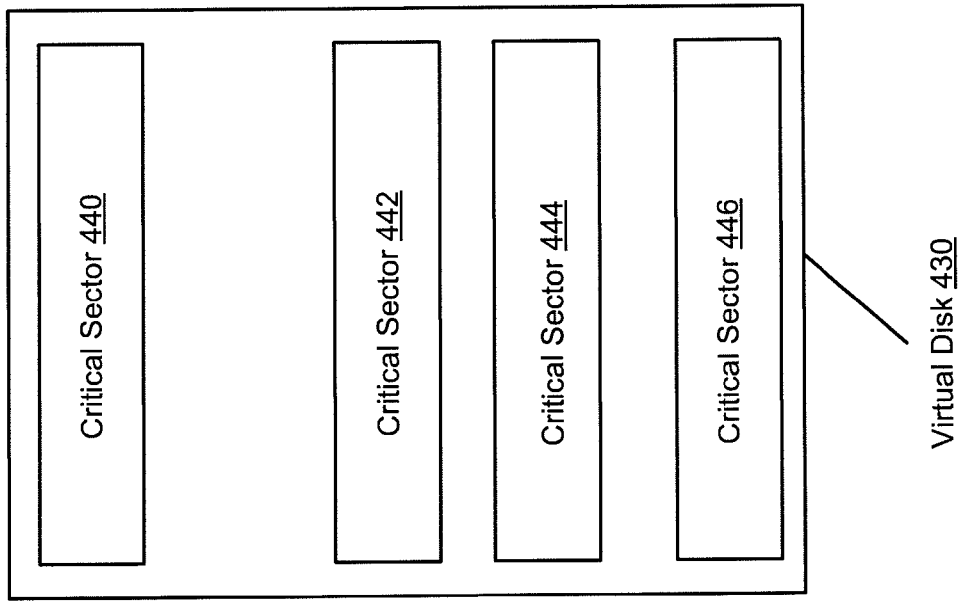
FIG. 4 is a block diagram showing relevant components of an example physical disk and a corresponding example virtual disk created according to one or more embodiments of the present invention.
Figure 4:
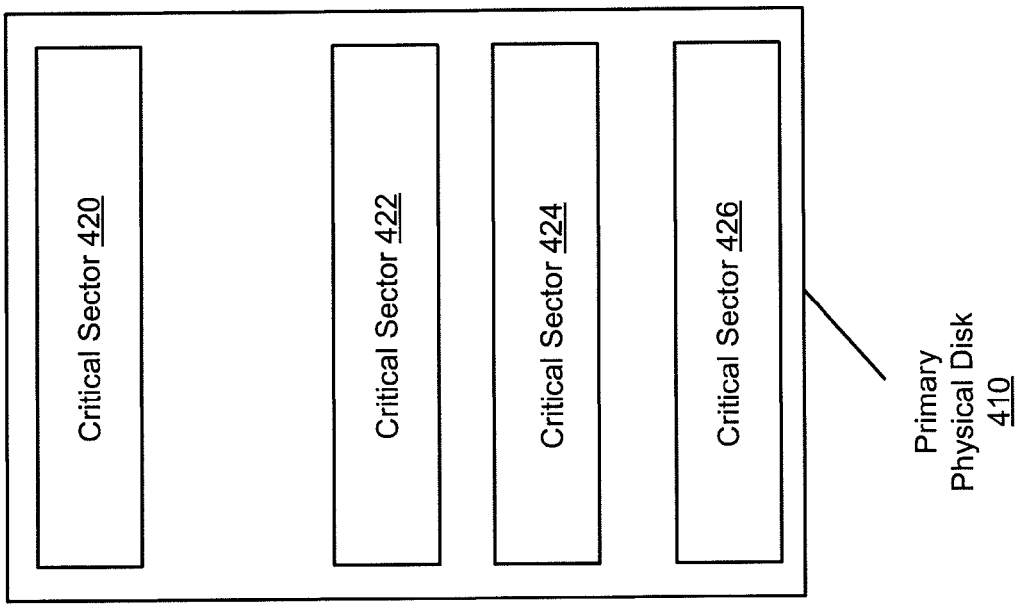

FIG. 4 is a block diagram illustrating relevant components of an example primary physical disk and an example corresponding virtual disk. As shown, primary physical disk 410 has critical sectors 420, 422, 424, and 426. In addition, primary physical disk 410 also includes user data that is stored within files and folders using a particular file system for each volume.

Critical sectors 420, 422, 424, and 426 are typically identified during a backup of physical disk 410. A sector number is assigned to each critical sector and the corresponding data within each critical sector is saved along with the assigned sector numbers. This critical data is then copied to a corresponding virtual disk after creation thereof using a secondary physical disk within a secondary disk array.

Virtual disk 430 ideally includes the same critical data (i.e., the same number of critical sectors and the same data within each critical sector) as primary physical disk 410, particularly after the method of FIG. 2 has been implemented by a backup server. As shown, virtual disk has critical sectors 440, 442, 444, and 446 which equate with critical sectors 420, 422, 424, and 426, both in content and sector position.

In addition, after a conversion occurs, virtual disk 430 would ideally include user data retrieved from memory and store such data within files and folders using the same file systems implemented within each volume of the primary physical disk.

Figure 5:
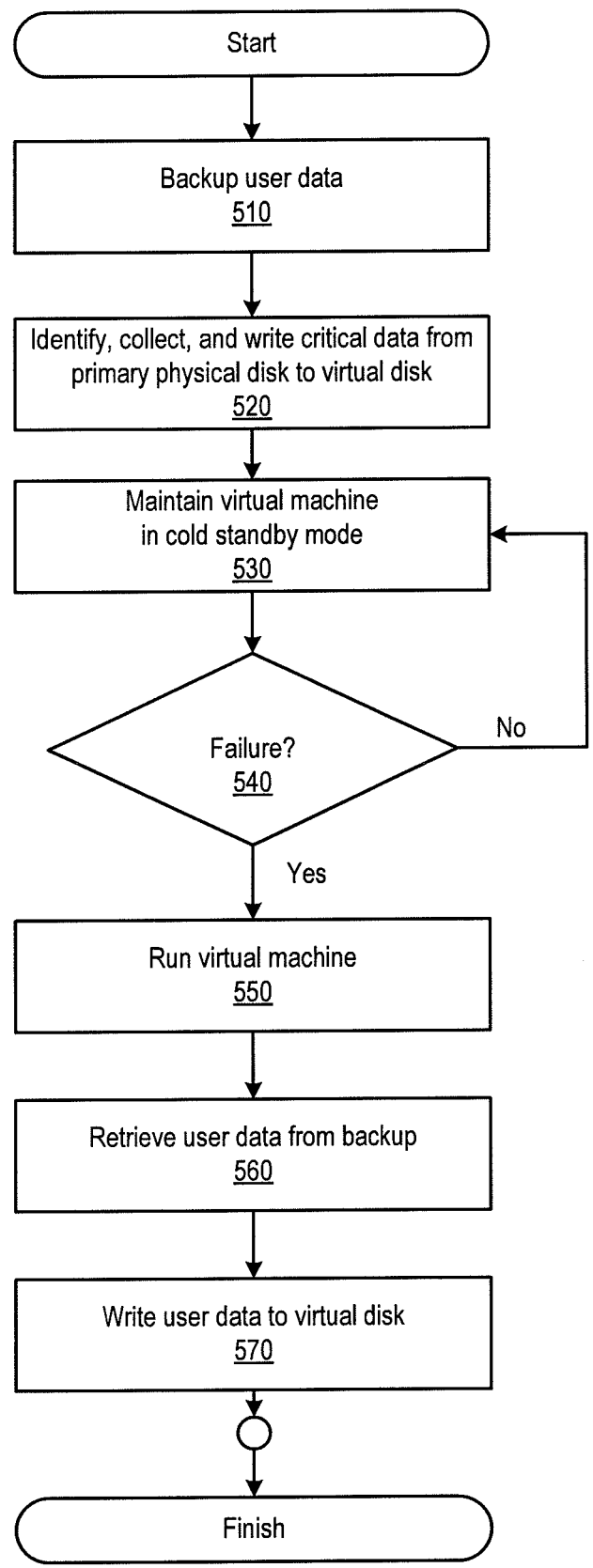
FIG. 5 is a flowchart illustrating relevant aspects of an example method for providing business continuity, according to one or more embodiments of the present invention.

FIG. 5 illustrates relevant aspects of an example method for providing business continuity. The method begins at 510, when a backup of user data on the primary physical disk is performed.

At 520, critical data is identified and collected from each primary physical disk. The critical sectors of each primary physical disk on a primary computing system are identified and the corresponding sector numbers and data are collected. This critical data is then written to an empty virtual disk after creation thereof. The identification, collection, and writing performed at 520 can occur at the same time that a backup process is performed.

A virtual machine within a secondary computing system is maintained in a cold standby mode, as shown in 530. In a cold-standby mode, user data within each virtual disk is not retrieved at the moment of backup (as is the case in a warm-standby mode). Instead, the user data is written to a respective virtual disk after a failure occurs at the primary computing system.

At 540, a determination is made as to whether a failure has occurred within the primary computing system. A failure within a primary computing system may be due to a disk failure and may render the primary computing system partly or completely unusable. If a failure is detected on the primary computing system, the virtual machine begins running, as shown in 550. The virtual machine can then access the virtual disks that have been created to correspond to the primary physical disks.

The user data is retrieved from backup after a failure occurs and after a virtual machine begins running, as shown in 560. The user data is then written to each respective virtual disk at respective file and folder locations, as shown in 570. Once the user data is written to each virtual disk, the process finishes. The writing of the user data into respective virtual disks may take a significant amount of time to complete. It is for this reason that operating a virtual machine in a warm-standby mode (e.g., as shown in FIG. 2) is preferable.

Figure 6:
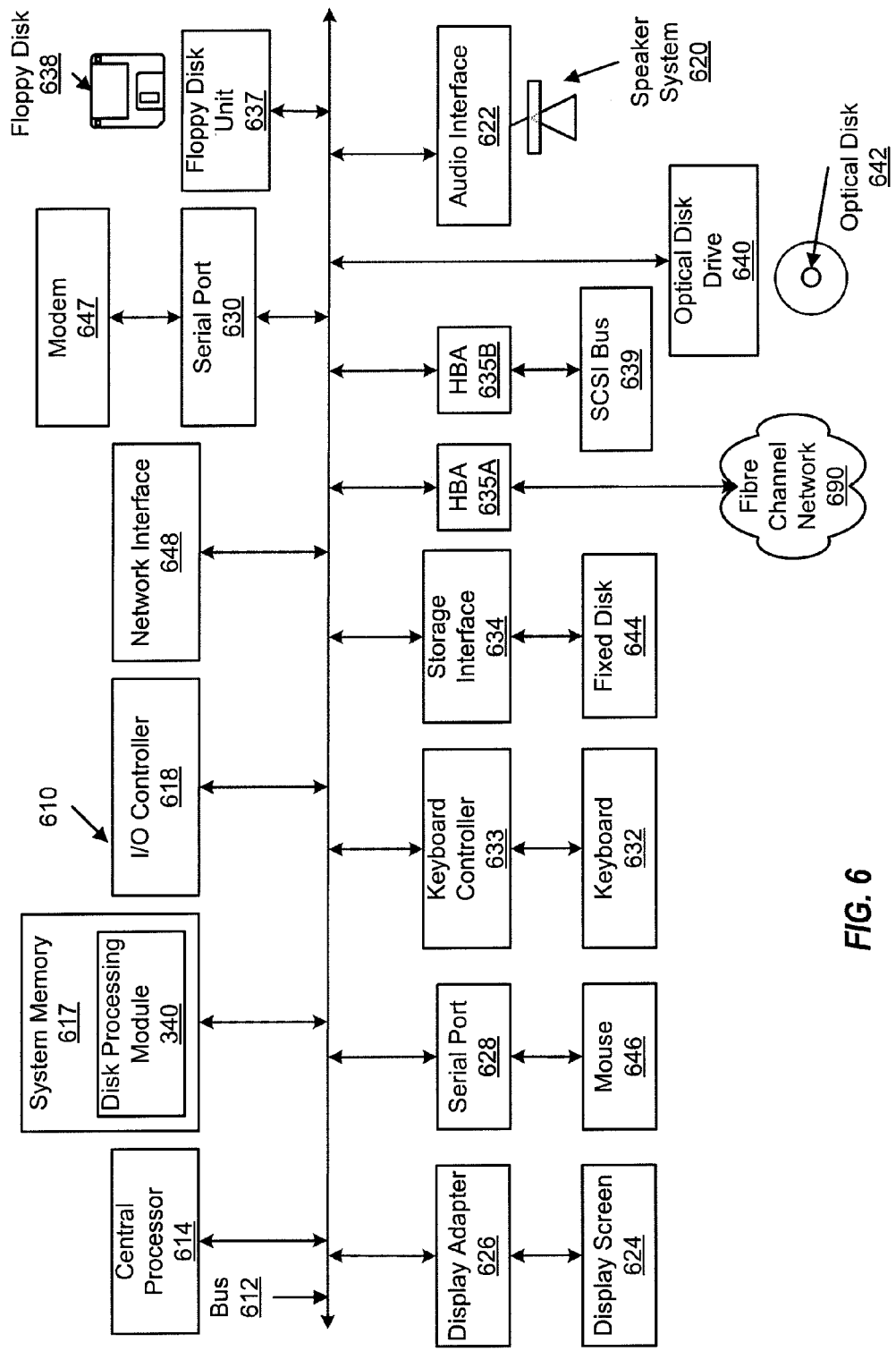
FIG. 6 is a block diagram of a computing system.

FIG. 6 is a block diagram of a computing system 610 suitable for implementing the creation of a virtual disk as described above. Computer system 610 includes a bus 612 which interconnects major subsystems of computer system 610, such as a central processor 614, a system memory 617 (typically RAM, but which may also include ROM, flash RAM, or the like, and may also include the disk processing module 340), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer-readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer-readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an interne service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras, and so on). Conversely, all of the devices shown in FIG. 6 need not be present to practice the present invention. The devices and subsystems can be interconnected in different ways from that shown in FIG. 6. The operation of a computer system is readily known in the art and is not discussed in detail in this application. Code to implement the present invention can be stored in computer-readable storage media such as one or more of system memory 617, fixed disk 644, optical disk 642, or floppy disk 638. The operating system provided on computer system 1010 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
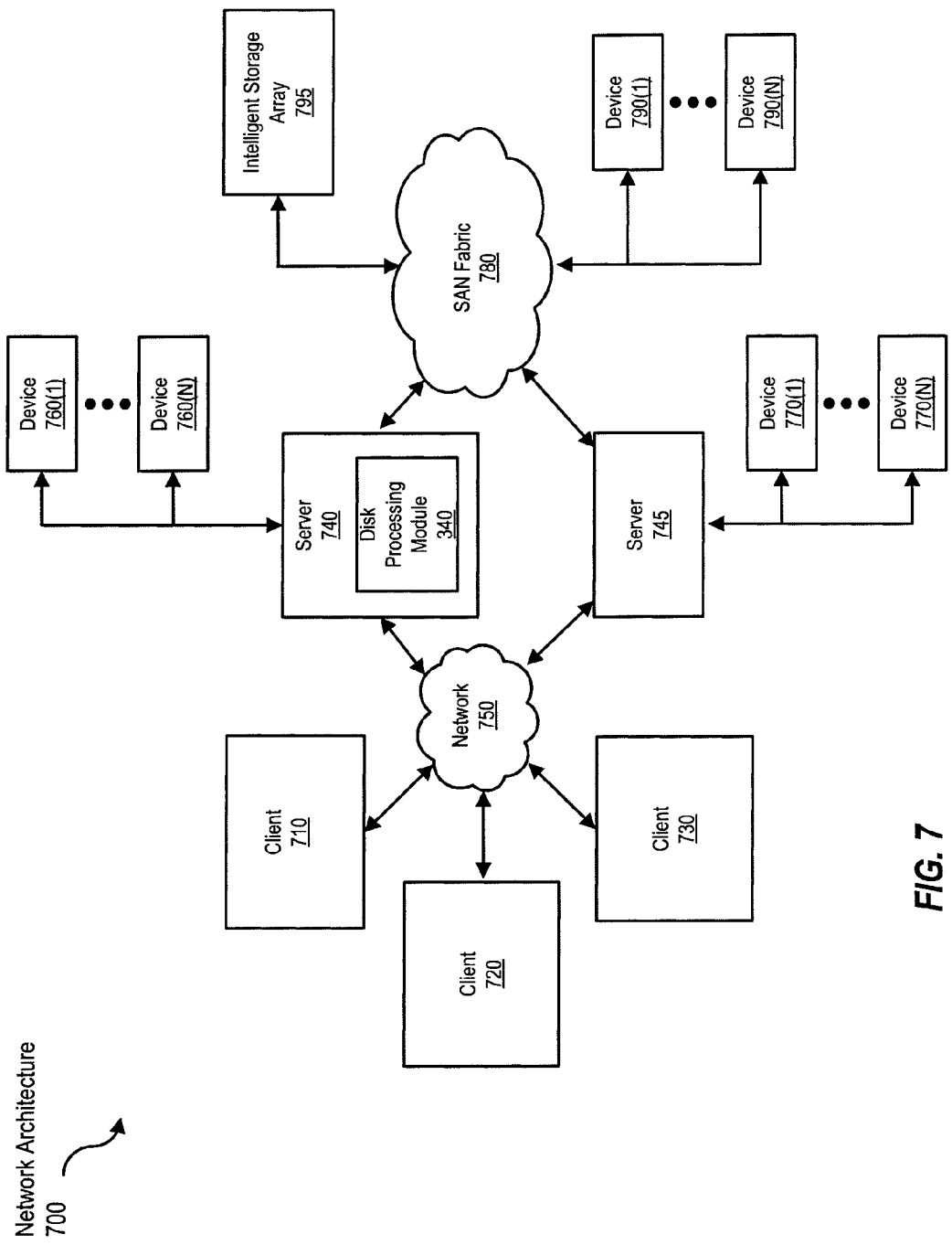
FIG. 7 is a block diagram of a networked system.

FIG. 7 is a block diagram of a network architecture 700 in which client systems 710, 720, and 730 and servers 740 and 745 may be coupled to a network 750. Client systems 710, 720, and 730 generally represent any type or form of computing device or system, such as computing system 610 in FIG. 6.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include a disk processing module 340 as shown in FIGS. 3 and 6.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as Network File System (NFS), Server Message Block (SMB), or Common Internet File System (CIFS).

Servers 740 and 745 may also be connected to a storage area network (SAN) fabric 780. SAN fabric 780 generally represents any type or form of computer network or architecture capable of facilitating communication between multiple storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to computing system 610 of FIG. 6, a communication interface may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the embodiments disclosed herein may also be encoded as a computer program, stored in server 740, run by server 745, and distributed to client systems 710, 720, and 730 over network 750.

In some examples, all or a portion of the computing devices in FIGS. 1, 3, 4, 6, and 7 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a disk processing module 340 in FIG. 3 may transform received critical data into a virtual disk.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    receiving sector numbers for critical sectors of a first physical disk on a primary computer system, wherein
        the critical sectors comprise sectors of the first physical disk comprising information used to operate the first physical disk;
    receiving corresponding data from the critical sectors of the first physical disk;
    creating a virtual disk, wherein
        the virtual disk comprises sectors;
    writing the corresponding data from the critical sectors of the first physical disk into respective sectors of the virtual disk, wherein
        the respective sectors of the virtual disk are identified by the sector numbers, and
        the creating and the writing are performed during a backup operation; and
    after the writing the corresponding data from the critical sectors into the respective sectors of the virtual disk, writing user data within files stored on the first physical disk into respective files of the virtual disk.

2. The method of claim 1, further comprising:
    receiving second sector numbers for second critical sectors of a second physical disk on the primary computer system;
    receiving second corresponding data from the second critical sectors of the second physical disk;
    creating a second virtual disk, wherein
        the second virtual disk comprises second sectors; and
    writing the second corresponding data from the second critical sectors of the second physical disk into respective second sectors of the second virtual disk, wherein
        the respective second sectors of the second virtual disk are identified by the second sector numbers.

3. The method of claim 1, further comprising:
    accessing a virtual machine, in the event of a failure in the primary computer system or the first physical disk, wherein
        the virtual machine accesses the virtual disk.

4. The method of claim 1, wherein
    the critical sectors comprise one of a master boot record sector, an extended boot partition sector, a logical disk manager sector, and an extensible firmware interface.

5. The method of claim 1, further comprising:
    mounting a volume in the virtual disk; and
    formatting the volume according to a file system.

6. The method of claim 1, wherein
    the sector numbers and the corresponding data from the critical sectors of the first physical disk are received during the backup operation.

7. The method of claim 1, further comprising:
    performing a backup of the user data within the files stored on the first physical disk, wherein
        the user data is backed up as files; and
    storing the user data on a backup server.

8. The method of claim 7, further comprising:
    receiving the user data from the backup server.

9. A non-transitory computer readable storage medium comprising program instructions executable to:
    receive sector numbers for critical sectors of a first physical disk on a primary computer system, wherein
        the critical sectors comprise sectors of the first physical disk comprising information used to operate the first physical disk;
    receive corresponding data from the critical sectors of the first physical disk;
    create a virtual disk, wherein
        the virtual disk comprises sectors;
    write the corresponding data from the critical sectors of the first physical disk into respective sectors of the virtual disk, wherein
        the respective sectors of the virtual disk are identified by the sector numbers, and
        the create and the write are performed during a backup operation; and
    write user data within files stored on the first physical disk into respective files of the virtual disk, after the corresponding data from the critical sectors has been written into the respective sectors of the virtual disk.

10. The non-transitory computer readable storage medium of claim 9, wherein the program instructions are further executable to:
    receive second sector numbers for second critical sectors of a second physical disk on the primary computer system;
    receive second corresponding data from the second critical sectors of the second physical disk;
    create a second virtual disk, wherein
        the second virtual disk comprises second sectors; and
    write the second corresponding data from the second critical sectors of the second physical disk into respective second sectors of the second virtual disk, wherein
        the respective second sectors of the second virtual disk are identified by the second sector numbers.

11. The non-transitory computer readable storage medium of claim 9, wherein the program instructions are further executable to:
    access a virtual machine, in the event of a failure in the primary computer system or the first physical disk, wherein
        the virtual machine accesses the virtual disk.

12. The non-transitory computer readable storage medium of claim 9, wherein the program instructions are executable to:
mount a volume in the virtual disk; and
format the volume according to a file system.

13. The non-transitory computer readable storage medium of claim 9, wherein
the sector numbers and the corresponding data from the critical sectors of the first physical disk are received during the backup operation.

14. The non-transitory computer readable storage medium of claim 9, wherein the instructions are further executable to:
perform a backup of the user data within the files stored on the first physical disk, wherein
the user data is backed up as files; and
store the user data on a backup server.

15. The non-transitory computer readable storage medium of claim 14, wherein the program instructions are further executable to:
receive the user data from the backup server.

16. A system comprising:
a virtual machine;
one or more processors; and
memory coupled to the one or more processors, wherein the memory stores program instructions executable by the one or more processors to:
receive sector numbers for critical sectors of a first physical disk on a primary computer system, wherein
the critical sectors comprise sectors of the first physical disk comprising information used to operate the first physical disk,
receive corresponding data from the critical sectors of the first physical disk,
create a virtual disk, wherein
the virtual disk comprises sectors,
write the corresponding data from the critical sectors of the first physical disk into respective sectors of the virtual disk, wherein
the respective sectors of the virtual disk are identified by the sector numbers, and
the create and the write are performed during a backup operation, and
write user data within files stored on the first physical disk into respective files of the virtual disk, after the corresponding data from the critical sectors has been written into the respective sectors of the virtual disk.

17. The system of claim 16, wherein the program instructions are further executable to:
receive second sector numbers for second critical sectors of a second physical disk on the primary computer system;
receive second corresponding data from the second critical sectors of the second physical disk;
create a second virtual disk, wherein
the second virtual disk comprises second sectors; and
write the second corresponding data from the second critical sectors of the second physical disk into respective second sectors of the second virtual disk, wherein
the respective second sectors of the second virtual disk are identified by the second sector numbers.

18. The system of claim 16, wherein the program instructions are further executable to:
access a virtual machine, in the event of a failure in the primary computer system or the first physical disk, wherein
the virtual machine accesses the virtual disk.

19. The system of claim 16, wherein the program instructions are further executable to:
mount a volume in the virtual disk; and
format the volume according to a file system.

20. The system of claim 16, wherein
the sector numbers and the corresponding data from the critical sectors of the first physical disk are received during the backup operation.

21. The method of claim 1, wherein
the critical sectors further comprise sectors of the first physical disk comprising information used to specify a geometry of the first physical disk.

22. The method of claim 1, wherein
the critical sectors are identified during the backup operation, and
the backup operation performs a backup of the user data stored on the first physical disk on a file-by-file basis.

\* \* \* \* \*